United States Patent
Schüssler et al.

(10) Patent No.: US 10,041,393 B2
(45) Date of Patent: Aug. 7, 2018

(54) METHOD FOR CHECKING THE EFFICACY OF AN EXHAUST GAS AFTER-TREATMENT DEVICE

(71) Applicant: AVL LIST GMBH, Graz (AT)

(72) Inventors: Martin Schüssler, Graz (AT); Markus Thaler, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 14/899,239

(22) PCT Filed: Jun. 16, 2014

(86) PCT No.: PCT/EP2014/062520
§ 371 (c)(1),
(2) Date: Dec. 17, 2015

(87) PCT Pub. No.: WO2014/202509
PCT Pub. Date: Dec. 24, 2014

(65) Prior Publication Data
US 2016/0177803 A1 Jun. 23, 2016

(30) Foreign Application Priority Data
Jun. 17, 2013 (AT) .............................. A 50392/2013

(51) Int. Cl.
*F01N 11/00* (2006.01)
*F01N 3/20* (2006.01)

(52) U.S. Cl.
CPC ............ *F01N 11/00* (2013.01); *F01N 3/2066* (2013.01); *F01N 2550/02* (2013.01);
(Continued)

(58) Field of Classification Search
CPC .... F01N 11/00; F01N 3/2066; F01N 2550/02; F01N 2610/00; F01N 2610/14; Y02T 10/47
See application file for complete search history.

(56) References Cited

U.S. PATENT DOCUMENTS 3,852,042 A * 12/1974 Wagner ................. F01N 3/2853
422/176
5,794,445 A * 8/1998 Dungner ............... F01N 13/107
60/605.2
(Continued)

FOREIGN PATENT DOCUMENTS

DE        3738538       5/1989
DE      102004013557   10/2005
(Continued)

OTHER PUBLICATIONS

English Abstract of DE 102004013557.
English Abstract of EP 0294715.
English Abstract of DE 3738538.

*Primary Examiner* — Brandon Lee
(74) *Attorney, Agent, or Firm* — Dykema Gossett PLLC

(57) ABSTRACT

The invention relates to a method for checking the efficacy of an exhaust gas after-treatment device (9), especially of a catalyst, for an internal combustion engine, exhaust gas generated by a donor internal combustion engine (2) flowing through the exhaust gas after-treatment device (9) to be checked. In order to allow the efficacy of an exhaust gas after-treatment device (9) to be checked with a high degree of flexibility and in a simple manner, a partial quantity is withdrawn from the exhaust gas flow of the donor internal combustion engine (2) and is fed to a defined partial inlet cross-section (22) of the exhaust gas after-treatment device (9) to be checked.

16 Claims, 2 Drawing Sheets

(52) U.S. Cl.
CPC ...... *F01N 2610/00* (2013.01); *F01N 2610/14* (2013.01); *Y02T 10/47* (2013.01)

(56) References Cited

U.S. PATENT DOCUMENTS

| | | | |
|---|---|---|---|
| 6,029,443 A * | 2/2000 | Hirota | F01N 3/2006 60/298 |
| 2010/0026488 A1 | 10/2010 | Bailey | |
| 2014/0026545 A1* | 1/2014 | Mori | F01N 3/2033 60/286 |

FOREIGN PATENT DOCUMENTS

| | | |
|---|---|---|
| EP | 0849588 | 6/1988 |
| EP | 0294715 | 12/1988 |

\* cited by examiner

METHOD FOR CHECKING THE EFFICACY OF AN EXHAUST GAS AFTER-TREATMENT DEVICE

BACKGROUND OF THE INVENTION

Field of the Invention

The invention relates to a method for checking the efficacy of an exhaust gas after-treatment device, in particular a catalytic converter, for an internal combustion engine, wherein exhaust gas generated in a donor internal combustion engine flows through the exhaust gas after-treatment device to be tested. Furthermore, the invention relates to a test stand arrangement for carrying out the method, Catalytic converters are tested either as original parts, which correspond to the size in the real application in the exhaust gas stream of a real internal combustion engine, or as small test catalytic converters in a synthetic gas stream. In particular, in early development phases, small test objects having catalytic converter materials are used in a synthetic gas stream, which has the disadvantage, however, that the catalytic converter material cannot be tested using real exhaust gas of an internal combustion engine. In particular, the hydrocarbons typical for combustion are difficult to reproduce in a synthetic gas stream. Furthermore, the synthetic gas generally does not have particles. In late development phases, in contrast, often only more catalytic converters in full application size are available, which cannot be used to generate small test catalytic converters for a synthetic gas test stand, however. On the other hand, in the testing using real size catalytic converter components, the starting conditions for the exhaust gas after-treatment system cannot be varied independently and broadly enough. They are substantially dependent on the operating mode of the internal combustion engine. The cost and availability of such test stands are further influencing variables.

DE 10 2004 013 557 A1 describes a device for checking an internal combustion engine exhaust gas catalytic converter, which has a heat exchanger, a gas analyzer, and an internal combustion engine for providing the exhaust gas.

Adding a gas to the exhaust stream before the catalytic converter and checking it using a gas analyzer is known from EP 0 294 715 A2.

The object of the invention is to avoid the disadvantages mentioned and to enable checking of the efficacy of an exhaust gas after-treatment device with a high level of flexibility in the simplest possible manner.

SUMMARY OF THE INVENTION

This is achieved according to the invention in that a partial exhaust gas quantity is taken from the exhaust gas stream of the donor internal combustion engine and supplied to a defined portion of the exhaust gas after-treatment device to be tested.

Because only a partial exhaust gas quantity is taken from the exhaust gas mass stream of the donor internal combustion engine and the partial exhaust gas quantity is only supplied to a defined portion of the exhaust gas after-treatment device to be tested, exhaust gas after-treatment devices of different sizes can be tested using the same testing system.

In this case, exhaust gas is supplied only to a partial entry cross section of the exhaust gas after-treatment device. The remaining entry cross section of the exhaust gas after-treatment device remains inactive. It is particularly advantageous in this case if entry and exit cross-sectional areas of the exhaust gas after-treatment device are masked before supplying the partial exhaust gas quantity. As mentioned above, the regions masked in this manner are the unused entry and exit cross-sectional areas.

The testing is therefore completely independent of the size of the internal combustion engine and of the size of the exhaust gas after-treatment device.

A high level of flexibility in the testing conditions can be achieved if at least one additional reactant for the exhaust gas after-treatment device, preferably from the group CO, NO, $NO_2$, $SO_2$, $NH_3$, or hydrocarbon, is added to the partial exhaust gas quantity upstream of the exhaust gas after-treatment device (for example, a catalytic converter). This enables a particularly effective test of the exhaust gas after-treatment device under more difficult conditions, with high quality of the obtained data at the same time, wherein the test conditions can be adapted precisely to the respective requirements. Therefore, many test sequences can already be carried out before the testing on the motor test stand begins.

Therefore, harmful materials for the exhaust gas after-treatment device can also be added to the partial quantity. In this manner, for example, the metal characteristics can be studied under accelerated aging conditions against a real exhaust gas background.

It is particularly advantageous if the partial exhaust gas quantity is temperature-controlled upstream of the exhaust gas after-treatment device. In this case, it can be provided that the partial exhaust gas quantity is heated using at least one heating device and/or the partial exhaust gas quantity is cooled using at least one cooling device. The heating and/or cooling device can be formed in each case by a heat exchanger, wherein a single heat exchanger can also function as a heating and cooling device. Furthermore, it is also possible to use electrical heating and cooling devices, such as resistance heating elements or Peltier elements, which causes rapid response times, Therefore, the partial quantity taken from the exhaust gas of the internal combustion engine—independently of the thermal state of the internal combustion engine—can be cooled or heated to arbitrary target temperatures. This enables the testing framework for the exhaust gas after-treatment device to be substantially expanded, It can be provided in the scope of the invention that the partial quantity of the exhaust gas is compressed by at least one compressor upstream of the exhaust gas after-treatment device. A compressor can be omitted if the partial quantity of exhaust gas is withdrawn in the region of a high-pressure portion of the exhaust gas system of the internal combustion engine.

In many applications, exhaust gas after-treatment devices are only available at full size, which are required for later development steps, such as calibrations of the internal combustion engine. Such exhaust gas after-treatment devices can also be tested using the method according to the invention, wherein—to achieve an equal or higher gas throughput—a part of the exhaust gas after-treatment device is turned off on the intake and/or outlet side. Therefore, only a small volume region of the exhaust gas after-treatment device is actually used for the testing.

Using the method according to the invention, much more specific analyses of full-size engine after-treatment components can be carried out than in synthetic gas test stands, The free temperature selection and gas composition enables a high level of flexibility in the experiments, wherein original exhaust gas of the donor internal combustion engine is used.

With the method according to the invention, exhaust gas of donor internal combustion engines of various sizes—i.e., both of small engines and also of utility vehicle engines up to large-scale engines—can be used.

The method according to the invention enables a representative characterization of the engine after-treatment components in a very early development stage.

The above-mentioned object is additionally achieved by a test stand arrangement as mentioned at the outset according to the invention in that it has a donor internal combustion engine having an exhaust line, from which at least one secondary exhaust line branches off, wherein the secondary exhaust line is connected to a defined entry cross section of an exhaust gas after-treatment device to be tested, so that a partial exhaust gas quantity can be taken from the exhaust gas stream via the secondary exhaust line and can be supplied to the defined partial entry cross section of the exhaust gas after-treatment device to be tested.

In one variant of the invention, the secondary exhaust line branches off in the region of a branching point from the exhaust line, wherein the exhaust line is continued downstream of the branching point as the main exhaust line. The exhaust line thus divides at the branching point into a main exhaust line and a secondary exhaust line.

At least one entry and/or exit cross-sectional area of the exhaust gas after-treatment device is advantageously closed by at least one screen.

In one variant of the invention, a gas metering unit for introducing gas into the exhaust gas stream is provided between donor internal, combustion engine and exhaust gas after-treatment device, wherein the gas metering unit preferably discharges into the secondary exhaust line. At least one additional reactant, preferably from the group CO, NO, $NO_2$, $SO_2$, $NH_3$, or hydrocarbon, is added via the gas metering unit.

To expand the testing framework for the exhaust gas after-treatment device, at least one temperature changing device, which has a cooling device and/or a heating device, is advantageously arranged between donor internal combustion engine and exhaust gas after-treatment device, preferably in the secondary exhaust line, wherein preferably the cooling device and/or the heating device has at least one heat exchanger and/or at least one electrical cooling or heating element.

In a further variant of the invention, the test stand arrangement has at least one gas analyzer connected to at least one sampling point for exhaust gas test quantities on the secondary exhaust gas stream.

At least one compressor and/or at least one flow rate adjusting element are advantageously arranged upstream of the exhaust gas after-treatment device, preferably upstream of the cooling device and/or the heating device and/or the gas metering unit.

BRIEF DESCRIPTION OF THE DRAWINGS

The invention will be explained in greater detail hereafter on the basis of nonrestrictive exemplary embodiments, which are illustrated in the figures. In the figures.

DETAILED DESCRIPTION OF THE DEPICTED EMBODIMENTS

Figure 1:
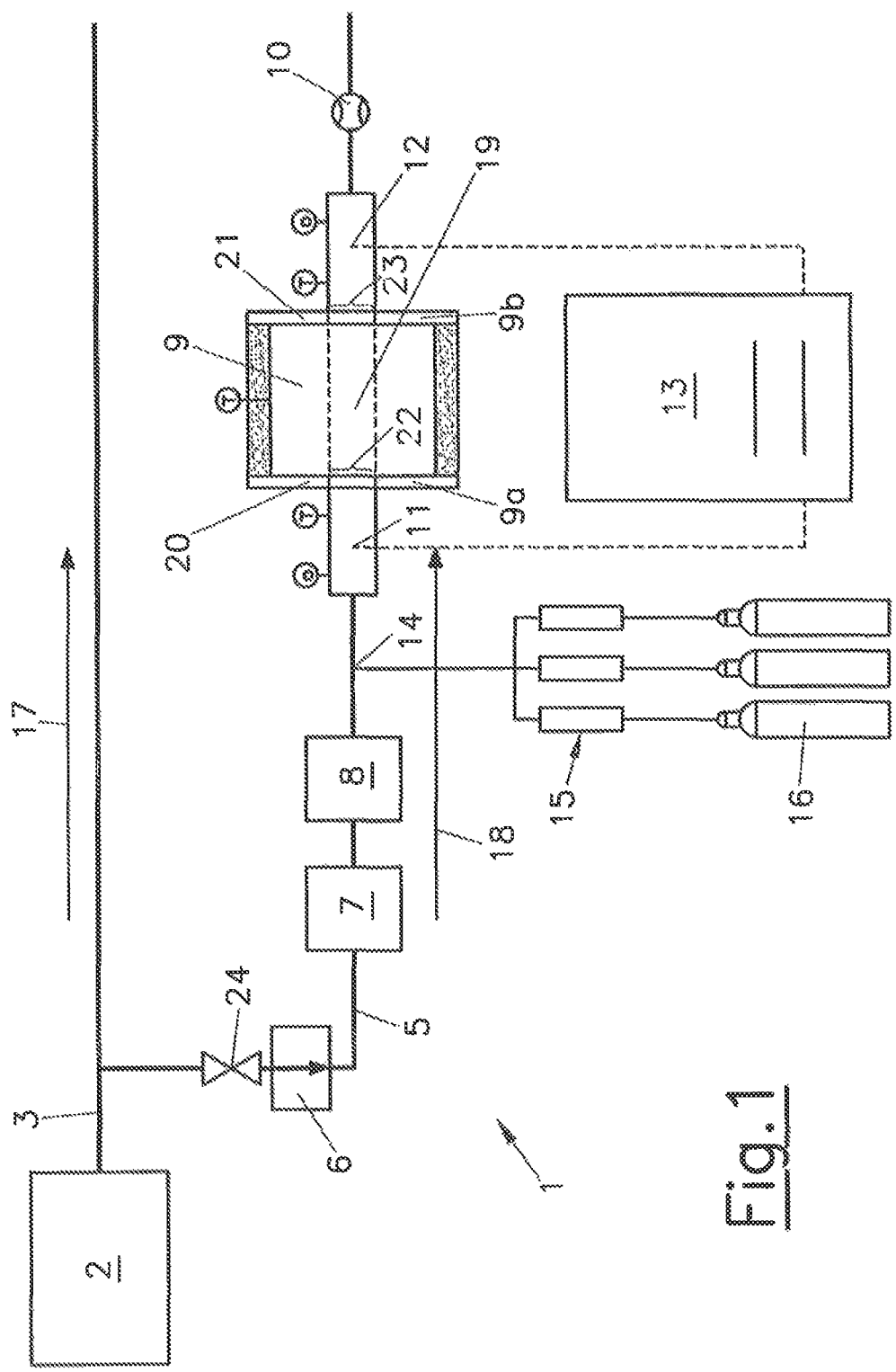
FIG. 1 shows a first variant of the test stand arrangement according to the invention for carrying out the method according to the invention.

FIG. 1 schematically shows a test stand arrangement 1 for carrying out the method according to the invention. The test stand arrangement 1 has a donor internal combustion engine 2, which generates exhaust gas for the checking, having an exhaust line 3, from which a secondary exhaust line 5 branches.

Figure 2:
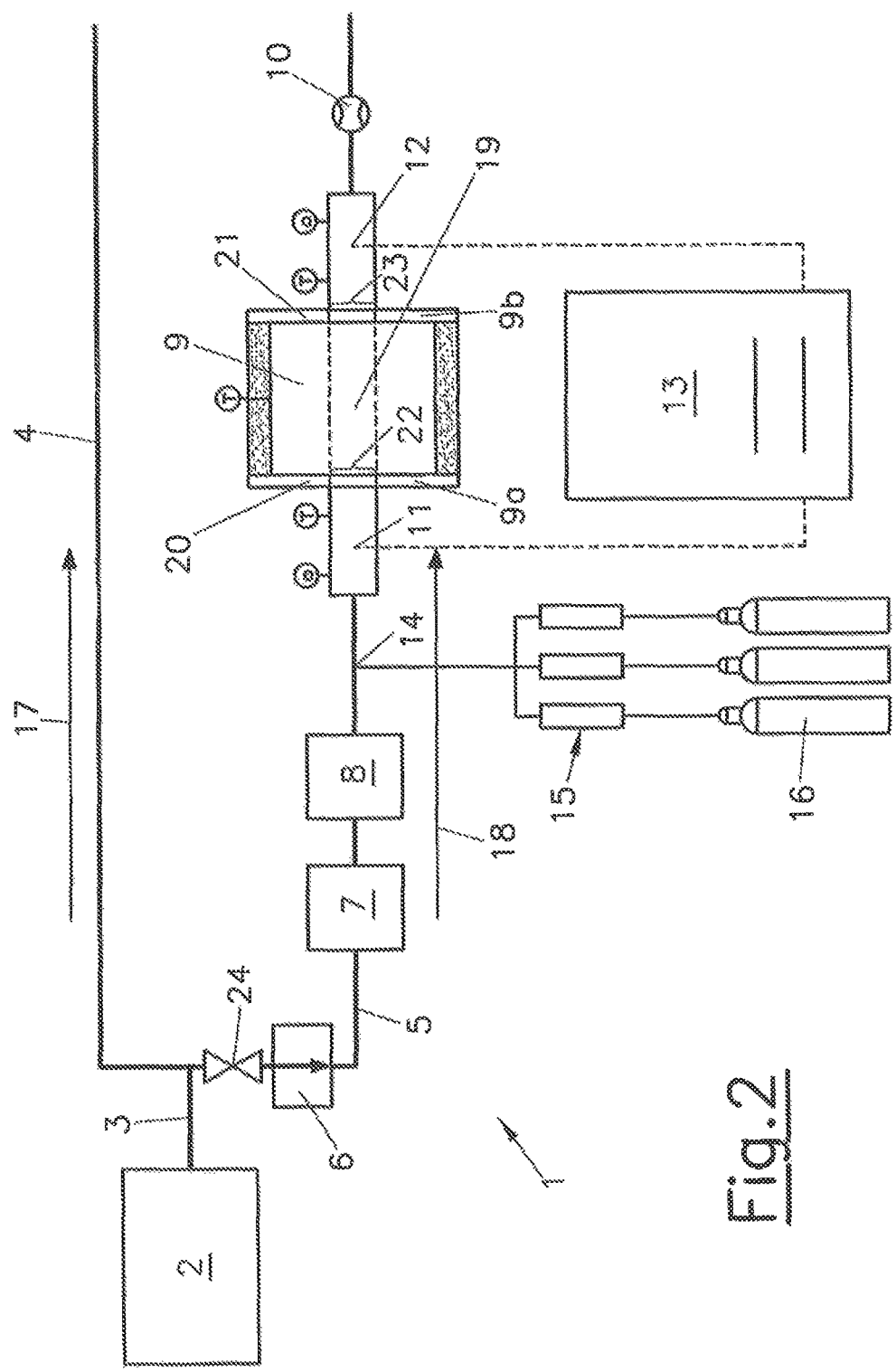
FIG. 2 shows a second variant.

FIG. 2 shows a variant in which the exhaust line 3 divides at a branching point into a main exhaust line 4 and a secondary exhaust line 5. Except for this, the variants illustrated in FIG. 1 and FIG. 2 are identical, wherein identical elements bear the same reference signs in both figures.

FIG. 2 shows a variant, in which the exhaust line 3 divides at a branching point into a main exhaust line 4 and a secondary exhaust line 5. Except for this, the variants illustrated in FIG. 1 and FIG. 2 are identical, wherein identical elements bear the same reference signs in both figures.

A compressor 6, at least one temperature changing device—in the illustrated exemplary embodiment a cooling device 7 and a heating device 8—and the exhaust gas after-treatment device 9 (for example, a catalytic converter) to be checked are arranged in the secondary exhaust line 5. A flow rate meter 10 is provided downstream of the exhaust gas after-treatment device 9. Sampling points 11 and 12 for an exhaust gas test quantity from the secondary exhaust line 5 are provided upstream and downstream of the exhaust gas after-treatment device 9, via which a small exhaust gas test quantity is supplied to a gas analyzer 13. Fundamentally, only a single such sampling point 11, 12 can also be provided either upstream or downstream of the exhaust gas after-treatment device 9.

The discharge opening 14 of a gas metering device 15 is provided upstream of the exhaust gas after-treatment device 9, via which at least one additional gaseous, liquid, or solid reactant 16, for example, a harmful material for the exhaust gas after-treatment device 9 from the group CO, NO, $NO_2$, $SO_2$, $NH_3$, or hydrocarbon can be supplied to the secondary exhaust line 5. The exhaust gas flow in the main exhaust line 4 is identified with reference signs 17, and the exhaust gas flow in the secondary exhaust line 5 with reference sign 18.

Reference signs p and T identify measurement points for pressure and temperature, respectively, upstream of the exhaust gas after-treatment device 9, in the exhaust gas after-treatment device 9, and downstream of the exhaust gas after-treatment device 9.

Via the secondary exhaust line 5, an exhaust gas partial quantity is taken from the exhaust gas of the internal combustion engine 2 and supplied to the exhaust gas after-treatment device 9 to be tested—however, only to a partial entry cross section 22 of the exhaust gas after-treatment device 9. Therefore, exhaust gas actually only flows through a small volume portion 19 of the exhaust gas after-treatment device 9. To achieve this, the exhaust gas after-treatment device 9 is masked on the entry and exit sides by screens 20, 21, which screens 20, 21 dose the entry cross-sectional area 9a and exit cross-sectional area 9b of the exhaust gas after-treatment device 9 except for the partial entry cross section 22 or partial exit cross section 23 through which the partial exhaust gas quantity flows.

Before the partial exhaust gas quantity reaches the exhaust gas after-treatment device 9 via the secondary exhaust line 5, the exhaust gas is thermally conditioned in the cooling device 7 and/or the heating device 8, i.e., brought to a desired target temperature. The cooling device 7 or heating device 8 can have a heat exchanger and/or an electrical cooling or heating element, respectively, such as a Peltier cooling element, a resistance heating element, or the like, to achieve rapid response behavior. This enables the exhaust gas testing to be carried out at various exhaust gas temperatures, without changing the measurement structure.

Cooling device 7 and heating device 8 can also be combined in a common temperature changing device.

Furthermore, the exhaust gas can be enriched via the gas metering unit 15 with various gaseous, liquid, or solid reactants 16—in the present case CO, NO, $NO_2$, $SO_2$, $NH_3$, HC, or the like—to increase the emission level for relevant exhaust gas components. This improves the quality and informative power of the examination of the exhaust gas after-treatment device 9.

The test stand arrangement 1 enables donor internal combustion engines 2 of different sizes and exhaust gas after-treatment devices 9 of different sizes to be used, wherein only the screens 20, 21 have to be adapted to the respective size of the respective exhaust gas after-treatment device 9. The partial exhaust gas quantity withdrawn from the exhaust gas of the exhaust line 3 can be set exactly via the flow rate setting element 24 and the compressor 6.

A defined exhaust gas partial quantity can thus be withdrawn from the exhaust gas stream of the donor internal combustion engine 2.

It is therefore possible to supply the exhaust gas after-treatment device g or parts thereof to tests and experiments already in very early development phases of an engine development, the results of which can be incorporated into the further development.

The invention claimed is:

1. A method for checking the efficacy of an exhaust gas after-treatment device for an internal combustion engine, comprising the following steps:
    (a) generating exhaust gas in a donor internal combustion engine and discharging an exhaust gas stream,
    (b) separating a partial exhaust gas quantity from the exhaust gas stream,
    (c) adding at least one reactant to the partial exhaust gas quantity,
    (c1) masking at least one entry or exit cross-sectional area of the exhaust gas after-treatment device, and
    (d) supplying the partial exhaust gas quantity with said at least one reactant to a defined partial entry cross section of the exhaust gas after-treatment device to be tested.

2. The method according to claim 1, wherein the at least one reactant added in step (c) is selected from the group consisting of CO, NO, $NO_2$, $SO_2$, $NH_3$ and hydrocarbon.

3. The method according to claim 1, comprising a step of controlling a temperature of the partial exhaust gas quantity taken from the exhaust gas stream in step (b) prior to step (d).

4. The method according to claim 3, wherein the step of controlling the temperature of the partial exhaust gas quantity comprises heating the partial exhaust gas quantity.

5. The method according to claim 1, wherein the step of controlling the temperature of the partial exhaust gas quantity comprises cooling the partial exhaust gas quantity.

6. The method according to claim 1, comprising the step of compressing the partial exhaust gas quantity prior to step (d).

7. A test stand apparatus for checking the efficacy of an exhaust gas after-treatment device for an internal combustion engine, comprising a donor internal combustion engine having an exhaust line, from which at least one secondary exhaust line branches off, wherein the secondary exhaust line is connected to a defined partial entry cross section of an exhaust gas after-treatment device to be tested, so that a partial exhaust gas quantity can be taken from the exhaust gas stream via the secondary exhaust line and can be supplied to the defined partial entry cross section of the exhaust gas after-treatment device to be tested, wherein the secondary exhaust line branches off in a region of a branching point from the exhaust line, wherein the exhaust line is continued downstream of the branching point as a main exhaust line, and wherein the test stand apparatus comprises at least one screen for closing at least one entry or exit cross-sectional area of the exhaust gas after-treatment device.

8. The test stand apparatus according to claim 7, wherein a gas metering unit for introducing gas into the exhaust gas stream is provided between the donor internal combustion engine and the exhaust gas after-treatment device, the gas metering unit discharging into the secondary exhaust line.

9. The test stand apparatus according to claim 8, wherein the gas metering unit discharges at least one reactant from the group consisting of CO, NO, $NO_2$, $SO_2$, $NH_3$, and hydrocarbon.

10. The test stand apparatus according to claim 7, including at least one temperature-changing device between the donor internal combustion engine and the exhaust gas after-treatment device.

11. The test stand apparatus according to claim 10, wherein the temperature-changing device includes a cooling device or a heating device.

12. The test stand apparatus according to claim 7, including at least one gas analyzer which is connected to at least one removal point for exhaust gas test quantities on the secondary exhaust line.

13. The test stand apparatus according to claim 7, including at least one compressor or at least one flow rate setting element arranged upstream of the exhaust gas after-treatment device.

14. The test stand apparatus according to claim 11, wherein the cooling device includes at least one heat exchanger or at least one electrical cooling element.

15. The test stand apparatus according to claim 11, wherein the heating device includes at least one heat exchanger or at least one electrical heating element.

16. The test stand apparatus according to claim 7, wherein at least one compressor or at least one flow rate setting element is arranged upstream of the cooling device or the heating device or the gas metering device.

* * * * *